United States Patent
Satarino et al.

[11] Patent Number: 5,912,368
[45] Date of Patent: Jun. 15, 1999

[54] AIR FILTER ASSEMBLY FOR AUTOMOTIVE FUEL VAPOR RECOVERY SYSTEM

[75] Inventors: Charles David Satarino, Ann Arbor; James T. Dumas, Clinton Township; Johanne Wilson, Dearborn Heights; Michael Cermak, Milford; Roger Khami, Troy; Neville Jimmy Bugli, Novi, all of Mich.

[73] Assignee: Ford Motor Company, Dearborn, Mich.

[21] Appl. No.: 09/050,139

[22] Filed: Mar. 30, 1998

[51] Int. Cl.$^6$ ...................................................... B01D 46/30
[52] U.S. Cl. .............................. 55/320; 55/385.3; 55/442; 55/443; 55/444; 55/445
[58] Field of Search .............................. 55/320, 442, 443, 55/444, 445, 385.3; 123/198 E

[56] References Cited

U.S. PATENT DOCUMENTS

| | | |
|---|---|---|
| 4,425,145 | 1/1984 | Reese ...................................... 55/385.3 |
| 4,628,689 | 12/1986 | Jourdan ..................................... 55/444 |
| 4,693,393 | 9/1987 | DeMinco et al. . |
| 4,772,299 | 9/1988 | Bogusz ..................................... 55/385.3 |
| 5,000,768 | 3/1991 | Hwang ..................................... 55/385.3 |
| 5,024,687 | 6/1991 | Waller . |
| 5,058,693 | 10/1991 | Murdock et al. . |
| 5,149,347 | 9/1992 | Turner et al . |
| 5,366,151 | 11/1994 | King et al. . |
| 5,501,198 | 3/1996 | Koyama . |
| 5,614,665 | 3/1997 | Curran et al. . |
| 5,638,786 | 6/1997 | Gimby . |
| 5,718,209 | 2/1998 | Scardino et al. ........................ 55/385.3 |

FOREIGN PATENT DOCUMENTS 360502  4/1906  France ...................................... 55/444

*Primary Examiner*—Jay H. Woo
*Assistant Examiner*—Minh-Chau T. Pham
*Attorney, Agent, or Firm*—Jerome R. Drouillard

[57] ABSTRACT

In a vehicle with an internal combustion engine and a fuel vapor recovery system including a carbon canister connected to the fuel tank for collecting fuel vapors from the fuel tank as the tank is being refilled, an air filtering apparatus is provided to supply a flow of clean and dry purge air to the canister for the purging of vapors therefrom. The air filtering apparatus includes gradually spaced baffle means and filter element means and is remotely connected in the evaporative emission control system by hoses connected to the air inlet and air outlet of the canister.

8 Claims, 3 Drawing Sheets

AIR FILTER ASSEMBLY FOR AUTOMOTIVE FUEL VAPOR RECOVERY SYSTEM

BACKGROUND OF THE INVENTION

1. Field of the Invention

This invention relates to an air filter for an automotive vehicle fuel vapor recovery system, which includes structures for gradually separating unwanted particles of dust, moisture, soot, and the like from the vapor recovery system purge air stream.

2. Disclosure Information

Conventional fuel vapor recovery systems used in automotive vehicles typically include a carbon canister used to recover excess fuel vapor generated in the fuel tank. Activated carbon in the carbon canister adsorbs the fuel vapor and temporarily retains the vapor until the canister is purged. During vehicle operation, at times determined by programmed vehicle calibration, the fuel vapor adsorbed by the activated carbon is desorbed by introducing outside air, or purge air, to the canister. The fuel vapor thus desorbed is fed to the engine for utilization in combustion. The present invention ensures that the air used to purge the carbon canister, or purge air, is dry and cleaned of particulate matter. This invention has been approved through theoretical calculations, computer simulations, and laboratory and road testing, and is involved in a current production program.

Filtering of-purge air introduced to a vapor recovery system to purge the carbon canister is not new. For the mentioned purpose, prior art examples teach the use of one or more assemblies comprising either a filter medium, baffle means, or both.

U.S. Pat. No. 5,058,693 to Murdock et al, U.S. Pat. No. 5,024,687 to Waller, and U.S. Pat. No. 5,638,768 to Gimby each disclose a remote fuel vapor recovery system filter assembly comprising the combination of baffle and filter element means. Both '693 and '687 include simple baffle means comprising no more than two independent baffle entities. The present invention discloses a plurality of mating and nonmating planar baffles, the increased complexity of which is matched by increased functional efficiency. Patent '768 provides a self-cleaning air filter comprising a filter element of various embodiments. In each embodiment, this mentioned element, so that it may be cleaned by the invention's filter cleaning member, is apparently a thin, firm, screen-like entity, and the filter includes provisions for function upon "occlusion" of this element. The present invention is comprised of a robust and hearty (thick, wide and tall) filter element and a baffle area, and has been proven to be able to last the average lifetime usage of vehicles (approximately 150,000 miles) without any cleaning.

There are two primary and novel factors contributing to the long-lasting functionality of our invention. The first is found in the design of the baffle section. The plurality of baffles are designed such that the particles, having wide size and inertial distributions, are dislodged from the air stream as it travels from inlet towards the filter section. This occurs due to decreased baffle spacing between baffles and the corresponding increase in mobility demand placed on the air flow. The second primary and novel quality of our invention is found in the implementation of a filter element so that the smallest particles (those that survive the baffle section) are generally lodged in the upper half of the filter element and eventually, due to gravity, vibration, etc., will migrate to the lower portions of the element. This occurrence will ensure the thorough cleaning of the air and the long-lasting function of the air filter assembly.

U.S. Pat. No. 4,693,393 to DeMinco et al and U.S. Pat. No. 5,501,198 to Korama disclose examples of filtering systems integrally combined within a carbon canister by comprising only baffle means and only filter element means, respectively. U.S. Pat. No. 5,149,347 to Turner et al also discloses a separator device comprising only a baffle section, which is remotely connected to the carbon canister. It is apparent that any structure comprising only baffle means or only filter means will not bet-as effective and robust as the present invention comprising both baffle and particulate filter means.

It is a feature of the present invention that both graduated baffle separation means and filter element means are included in a filter assembly. This assures a maximum degree of separation of particles, foreign matter, such as soot and road dust, moisture, and the like from the fresh air therein otherwise present.

SUMMARY OF THE INVENTION

The fuel vapor storage system (FVSS) of an automotive vehicle is used to contain, clean, and utilize the fuel filled air necessarily displaced upon filling of the fuel tank, so as not to introduce fuel vapor filled air to the atmosphere. The primary component in this system is the carbon canister. This canister, filled with activated carbon, functions by adsorbing the fuel vapor of any air introduced thereto. Proper function of the carbon canister and corresponding canister vent valve (CW) is accomplished best when periodically flushed with clean (purge) air.

The clean air mentioned prior is provided by outside air that has been filtered by the present inventive air filter assembly. Traditional FVS systems comprise either a filter with only filter element means, a filter with only baffle means, or, most commonly, no filter means at all. The present filter invention integrates both filter element and baffle means in such a way that substantially all necessary matter is separated from the purge air flow.

It is an object of the present invention to clean air by filtering it through the graduated baffle section-comprising a plurality of mating and nonmating baffle sets, the spaces between which gradually decreases-thereby forcing the air to travel an increasingly tortuous path. This prescribed path includes many turns and changes of direction and causes particles beyond a certain size (approximately 15 $\mu$m–20 $\mu$m) due to the inertial properties associated with their size, gravity, and the speed of the air stream, to separate from the ongoing stream of air.

It is a further object of the present invention to further clean air by filtering it through a filter media section comprising a filter element snugly disposed between retaining ribs. The filter element section is prescribed to filter substantially all remaining particles in the air stream, and particularly those between 1 $\mu$m and 20 $\mu$m in size. The preferred filter media is open cell reticulated foam, and the preferred style is an reticulated open cell laminated foam with between 30 and 65 p.p.i. (pores per inch).

It is an advantage of the present invention that substantially all particles, including, but not limited to, moisture (rain, snow, mist, condensation et al) and other matter (dirt, soot, road dust, dirt et al) will be separated from the air stream. The removal of these particles from the air flow ensures proper function of a fuel vapor recovery system (FVSS) by avoiding increased system restriction and premature canister vent valve (CVV) and carbon canister failures.

It is a further advantage that the present invention is durable, under normal to severe conditions, lasting the entirety of a vehicle's life, about 150,000 miles, without requiring cleaning, changing, replacement, or adjustments of any kind. This is primarily made possible by the even distribution of separated particles throughout the filter assembly, due to the filter (for the finest particles) being located after the baffle section which is gradually designed for this same distribution purpose.

It is yet a further advantage of the present invention that robustness is achieved in two primary ways. First, our air filter assembly may be remotely connected within the FVSS for easy access and for nondisturbance of the balance of the components therein. Secondly, due to specialty of design, our filter assembly can remain fully functional even after the inlet or outlet side of the assembly is tilted by plus or minus approximately 45°.

It is yet a further advantage of the present invention to be mountable in a variety of vehicles, automotive and other, due to its diverse mounting structures. These structures include molded mounting locations and universal clips.

Other features, objects, and advantages of the present invention will become apparent to the reader of the specification.

BRIEF DESCRIPTION OF THE DRAWINGS

The invention will now be described, by way of example, with reference to the accompanying drawings, in which.

DETAILED DESCRIPTION OF PREFERRED EMBODIMENTS

Figure 1:
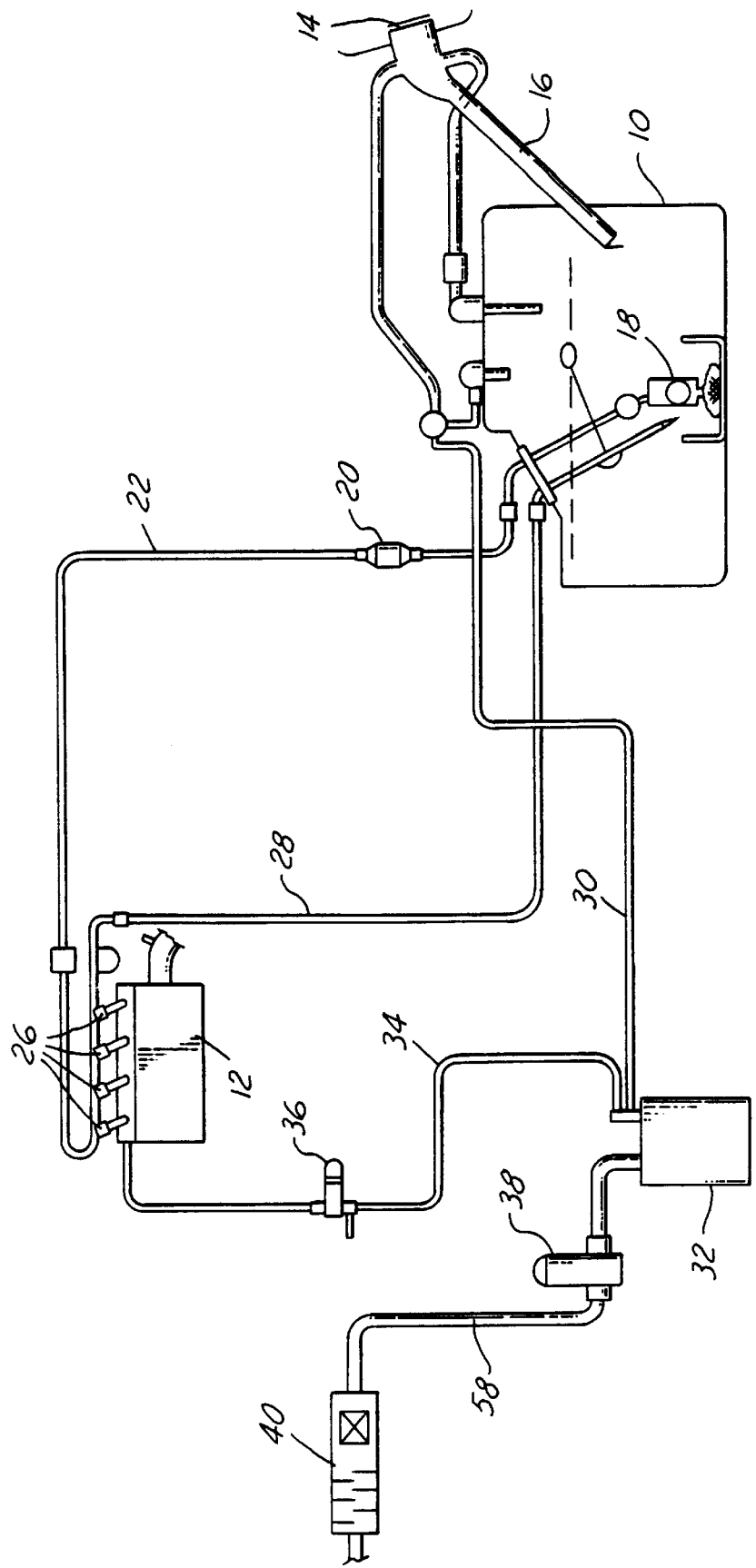
FIG. 1 is a schematic view of an automotive powerplant having a fuel vapor recovery system utilizing an air filter assembly according to the present invention.
Figure 2:
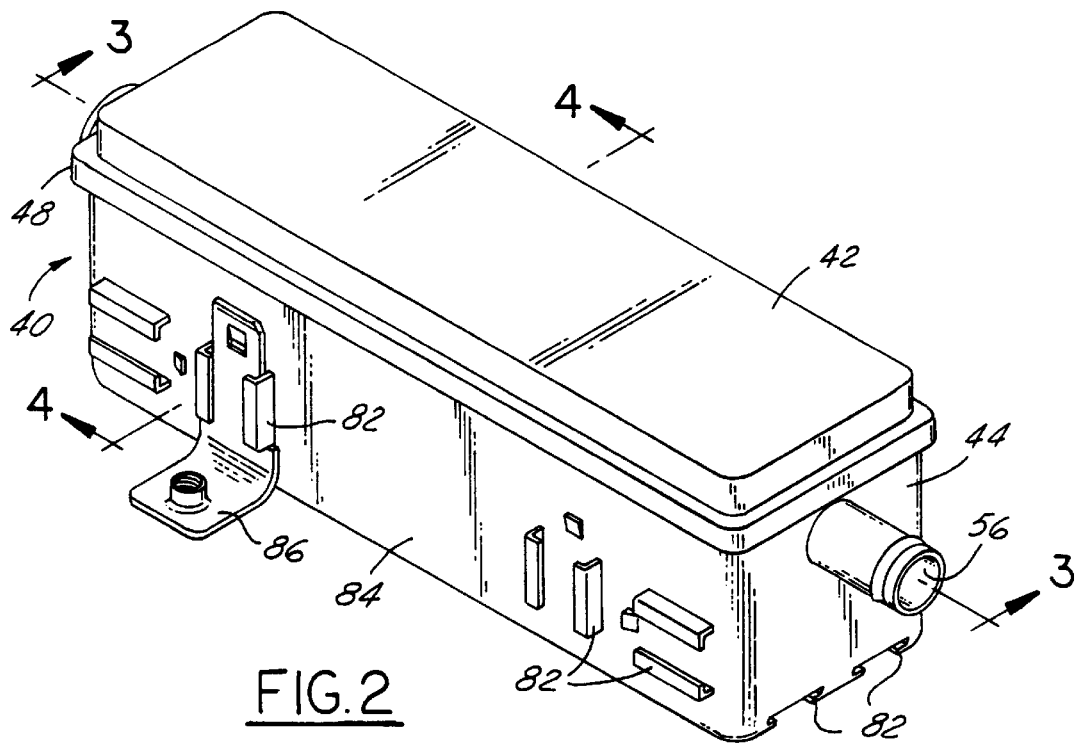
FIG. 2 is a perspective view of an air filter assembly according to the present invention.

FIG. 1 shows an automotive powerplant having an FVSS integrally disposed therein. Although some of the powerplant's specific components, geometry, and component names may differ from vehicle to vehicle, the primary structure and structural components will remain constant.

Primary components of the automotive powerplant are fuel tank 10 and internal combustion engine 12. Liquid fuel enters the vehicle by first being introduced to the fuel inlet opening 14 then traveling through fuel filler tube 16 into fuel tank 10. Fuel is sent by fuel pump 18 through fuel filter 20 and to engine 12 by way of fuel line 22, fuel rail 24, and fuel injectors 26. optionally, some systems will recycle fuel unused by engine 12 by sending it back to fuel tank 10 via the fuel return line 28.

There are generally two primary circumstances wherein fuel vapor filled air is forced out of fuel tank 10. The first circumstance is during the above outlined filling of tank 10 and the other occurs when the fuel vapor in the tank expands (usually due to increased temperature of the fuel and/or fuel vapor) and forces some of the fuel vapor out of the tank. In either case, the fuel vapor filled air is sent through fuel recovery line 30 to carbon canister 32 where it is cleaned of its vapor before being sent to the atmosphere. Carbon canister 32 is filled with activated carbon which adsorbs the fuel vapor from the air flow.

Periodically, carbon canister 32, after absorbing and cleaning the fuel vapor filled air, must be desorbed, or purged, of the fuel vapor therein. This refreshing is done so that the canister can accommodate and absorb additional fuel vapor from fuel tank 10.

Atmospheric air, to be used as purge air, is forced into and out of canister 32 and then sent through vapor purge line 34, and canister purge valve 36, directly to engine 12 for utilization.

As mentioned above, the outdoor air used as purge air must be cleaned of substantially all matter and moisture before it is introduced to canister vent valve 38 (CVV) and carbon canister 32. This is the purpose of the air filter assembly 40.

Figure 3:
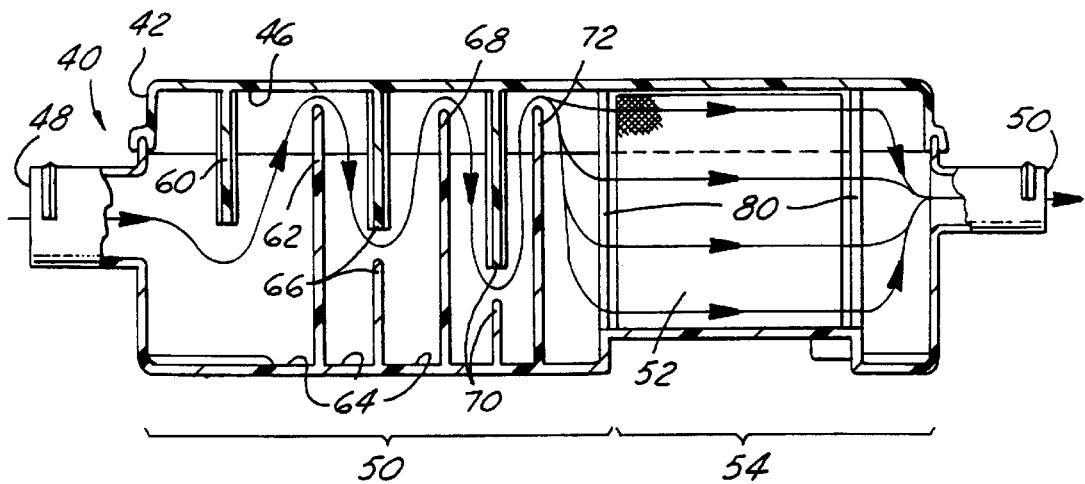
FIG. 3 is a cross-section of the air filter assembly of FIG. 2 taken along the line 3—3.
Figure 4:
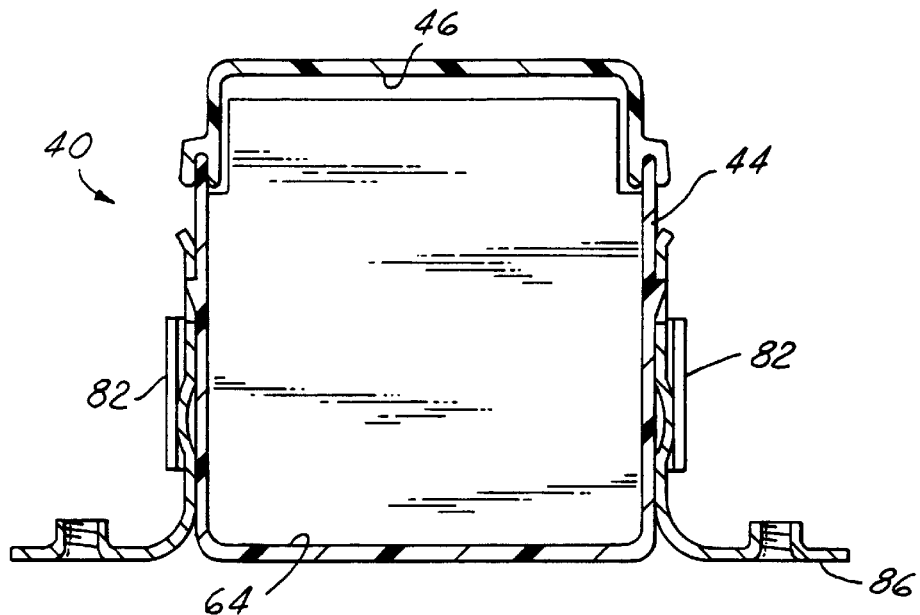
FIG. 4 is an end-section of the air filter assembly of FIG. 2 taken along the line 4—4.
Figure 5:
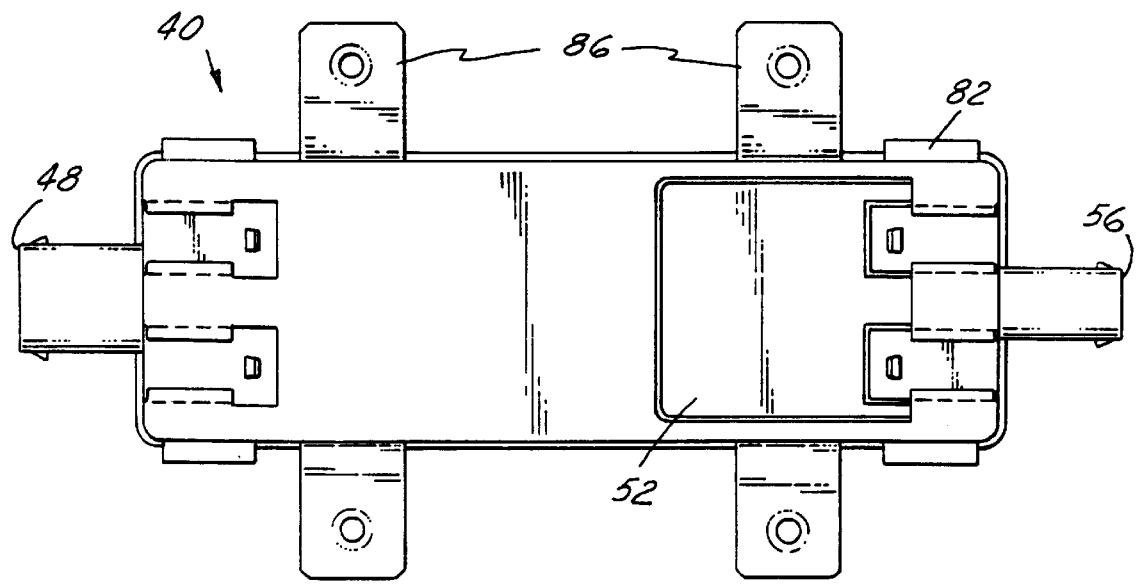
FIG. 5 is a plan view of the bottom of the air filter assembly of FIG. 2.

The preferred design of the air filter assembly 40, best viewed in FIG. 3, is composed of two primary components: a closure panel 42, which can be made to be removable, and a base 44. Closure panel 42 further comprises inner surface 46 strategically equipped with a plurality of baffles. Base 44 further comprises of an air inlet 48, a baffle section 50, a filter element 52 contained within filter section 54, and air outlet 56. Filter 52 is cubic in shape, thereby facilitating production efforts.

Air enters air filter assembly 40 only by way of air inlet 48 and exits only by way of air outlet 56. Immediately after being introduced to baffle section 50 of the assembly, air is forced to maneuver under a first nonmating baffle 60, extending inward from the inner surface 46 of the closure panel 42, and over a second nonmating baffle 62, extending inward from the floor of base 64. From here the air flow continues on to maneuver the first mating baffle set 66, the third nonmating baffle 68, the second mating baffle set 70, and the fourth and final nonmating baffle sets 72. As mentioned above, the larger particles (matter, moisture, et al), due to their developed inertia, will be unable to survive the increasingly demanding path prescribed in baffle section 50. This increasingly demanding path is designed in such a way that the Stokes Number of the air flowing through said baffle area 50 remains relatively unchanged. The unwanted particles will therefore fall out of the continuing air stream and become disposed in the corresponding retention area 74. The particles will remain in retention area 64 unless evaporated or otherwise disintegrated by natural means.

After leaving baffle section 50, purge air enters the filter section comprised primarily of filter element 52 and retention ribs 80. Filter element 52 is preferably a reticulated open cell foam and is designed so as to separate any remaining (usually very small, less than 20 $\mu$m) particles from the air stream. Retention ribs 80 assure the proper locating of the filter element 52 during manufacture. Upon leaving filter section 54, the clean air then travels out of air outlet 56 and through canister vent line 58 to carbon canister 32 for the purging thereof.

For the purpose of allowing flexible mounting and locating configuration of filter assembly 40, a plurality of sockets 82 is integrally formed upon a plurality of outer surfaces of the enclosure 84 to permit the manual attachment of mounting brackets 86 to the enclosure.

As witnessed by simulation, testing, and actual usage, a filter assembly 40 according to the present invention functions excellently in accomplishing the purpose of its design. The increasingly tortuous baffle section 50 removes particles which will generally be decreasing in size. Any smaller particles that survive this portion will most likely be trapped in the foam media of the filter element 52. Due to this dual stage filtering process, only a very clean air flow is sent on to the CVV and carbon canister 32 for successful purging.

While the invention has been shown and described in its preferred embodiments, it will be clear to those skilled in the art which they pertain that many changes and modifications may be made thereto with out departing from the scope of the invention.

We claim:

1. An air filter assembly for an evaporative emissions control canister of an automotive vehicle, comprising:

a generally rectangular enclosure having a removable closure panel and a base with a floor portion and a plurality of upstanding outer walls, an air inlet formed in a first end outer wall of the base;

an air outlet formed in a second end outer wall of the base;

a plurality of mating baffle sets for cleaning air flowing through said air filter assembly from said air inlet to said air outlet by forming a tortuous path, with each of said baffle sets comprising a planar baffle element extending inwardly from the floor portion of said base and a mating baffle element extending inwardly from an inner surface of said closure panel;

a first set of nonmating baffles extending inwardly from the floor reaching almost to the closure panel, and at least one nonmating baffle extending inwardly from the closure panel; and a cubic filter element disposed in said enclosure, adjacent to said second outer end wall, such that substantially all air passing through said assembly from said air inlet to said air outlet passes through said filter, with the space between said mating and nonmating baffle pluralities gradually decreasing the direction of air flow such that the separated particles are generally evenly distributed throughout the baffle section.

2. An air filter assembly according to claim 1, wherein said inlet and said outlet are diametrically offset such that said inlet is larger than said outlet.

3. An air filter assembly according to claim 1, wherein said filter element is cubic in shape and disposed within a compartment defined by retention ribs such that the filter element extends from one of said side walls to an opposing one of said side walls and from the floor portion of the base to an inner surface of the closure panel and from the second outer end wall part way to the first outer end wall.

4. An air filter assembly according to claim 1, wherein a baffle section is defined as the area within said assembly wherein said mating and nonmating baffle pluralities are disposed.

5. An air filter assembly for filtering purge air flowing into an evaporative emissions control canister of an automotive fuel system, comprising:

a generally rectangular enclosure having a removable closure panel and a base with a floor portion and a plurality of upstanding outer walls;

an air inlet formed in a first end outer wall of the base;

air outlet, diametrically smaller than said inlet, formed in a second end outer wall of the base;

a plurality of mating baffle sets disposed within said enclosure, extending sequentially from the said first end wall, for cleaning air flowing through said air filter assembly from said air inlet to said air outlet, with at least some of said baffle sets comprising a planar baffle element extending inwardly from the floor portion of said base, and a mating baffle element extending inwardly from an inner surface of said closure panel;

a set of nonmating baffles extending inwardly from the floor reaching almost to the closure panel, and at least one nonmating baffle extending inwardly from an inner surface of the closure panel; and a cubic filter element disposed adjacent to the second end wall in a compartment within said enclosure such that the filter element reaches from one side wall to the other, from the base to the closure panel, and from a location proximate the second end wall part way to the first end wall, such that substantially all air passing through said air filter assembly from said air inlet to said air outlet passes first through said baffles then through said filter.

6. An air filter assembly according to claim 5, wherein the media of said filter element is reticulated open cell foam which is laminated with heterogeneous and homogenous pore sizing, with and without pore size gradient, and has a ppi (pores per inch) rating of between 15 and 65.

7. An air filter assembly according to claim 5, further comprising a plurality of sockets integrally formed upon a plurality of outer surfaces of the enclosure to permit the manual attachment of mounting brackets to the enclosure.

8. An air filter assembly according to claim 5, wherein said air filter assembly is connected to a carbon canister by means of a hose extending between the carbon canister and said air filter assembly.

* * * * *